March 15, 1932.  W. W. NICKELS  1,849,732
VEHICLE BODY
Filed May 2, 1931  5 Sheets-Sheet 1

Inventor
W. W. Nickels
By Clarence A. O'Brien
Attorney

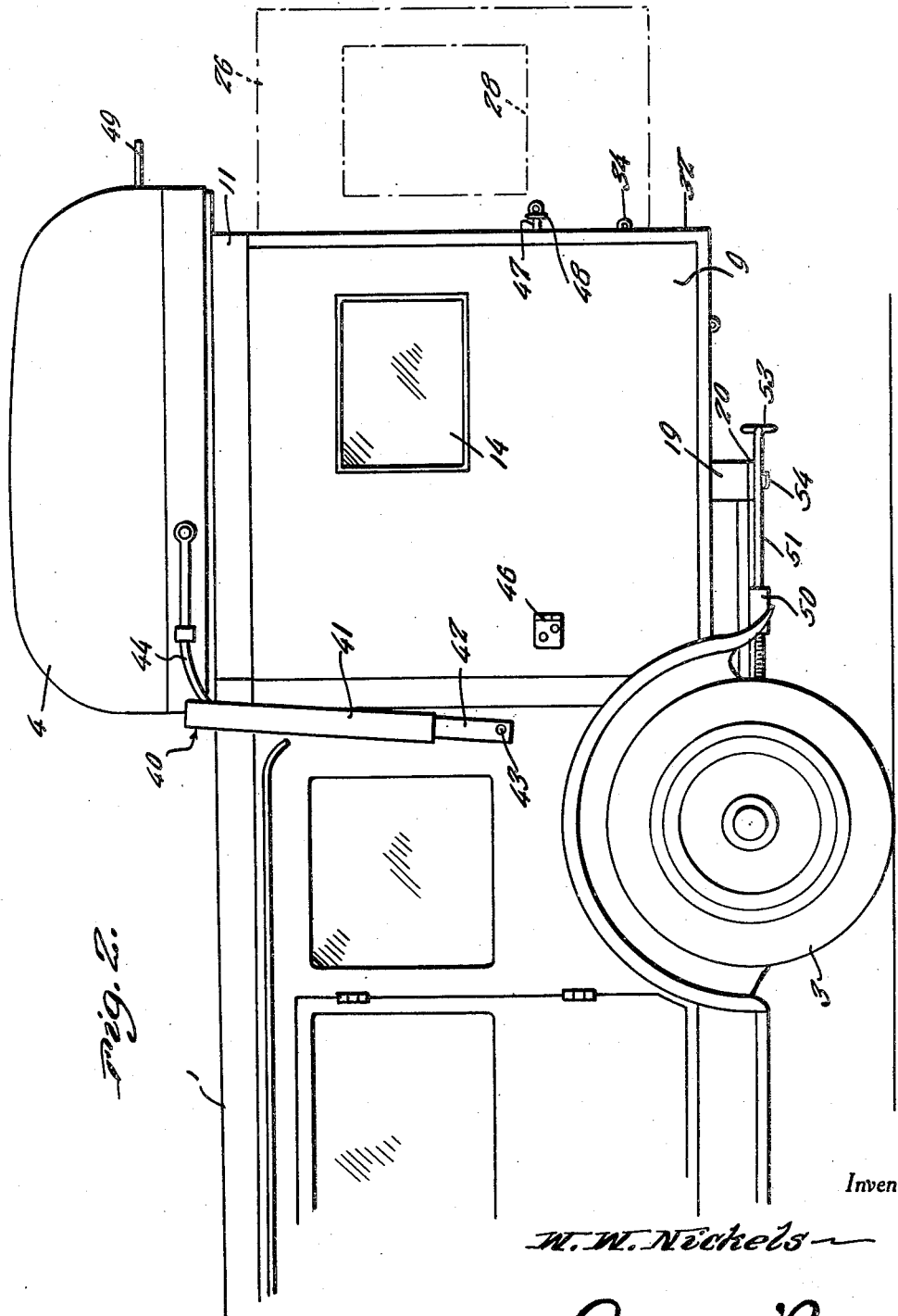

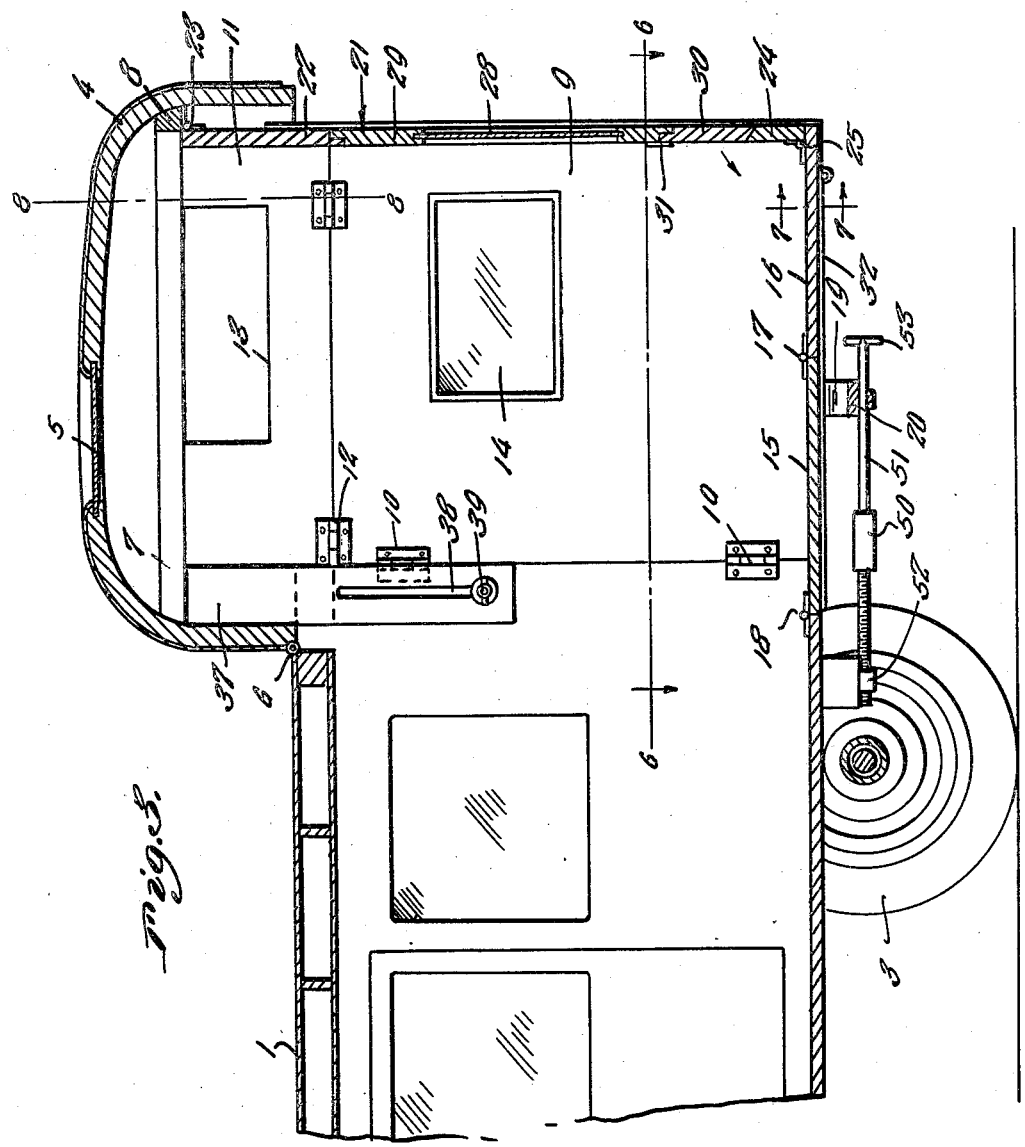

March 15, 1932. W. W. NICKELS 1,849,732
VEHICLE BODY
Filed May 2, 1931 5 Sheets-Sheet 4
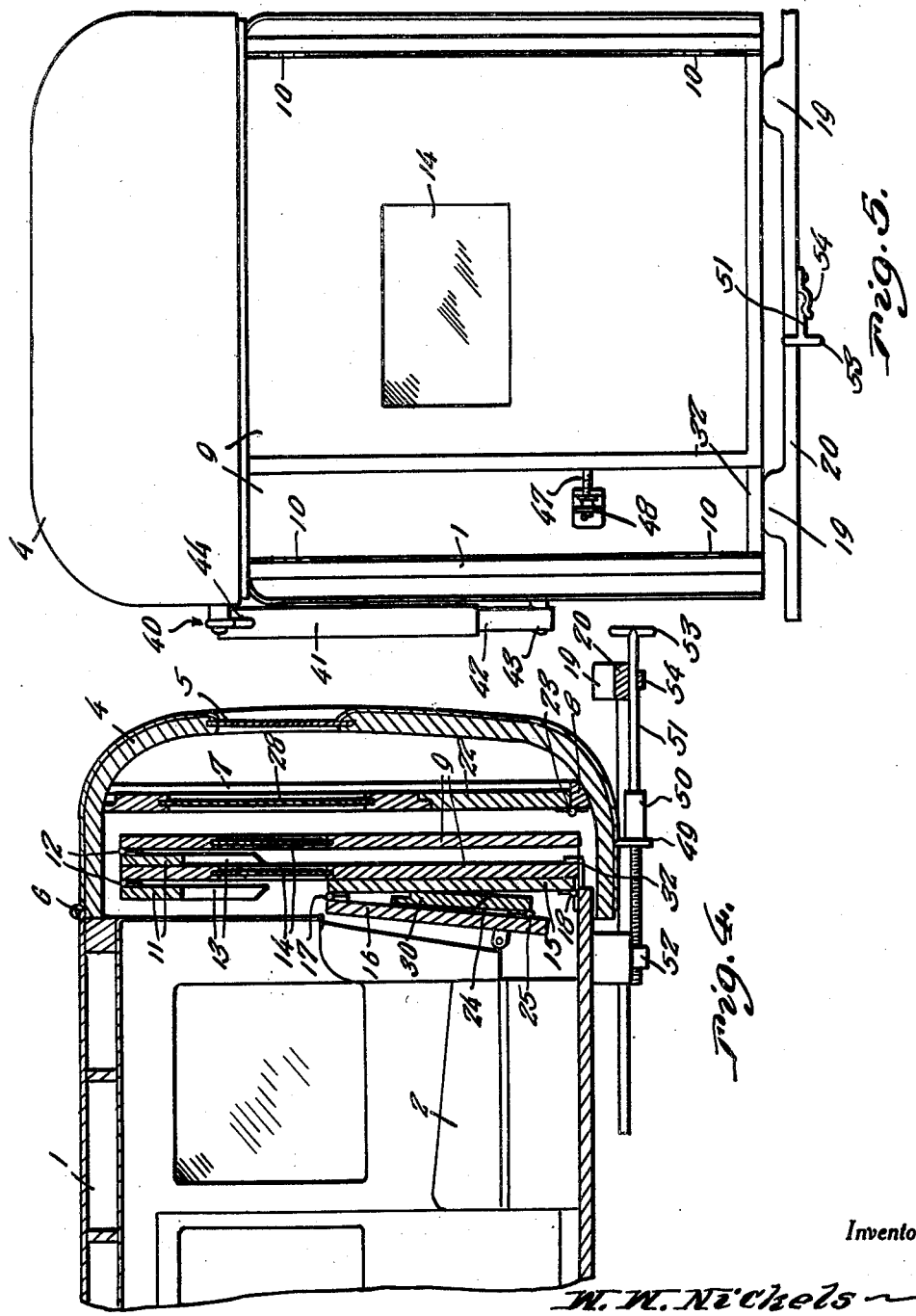
Inventor
W. W. Nickels
By Clarence A. O'Brien
Attorney March 15, 1932. W. W. NICKELS 1,849,732
VEHICLE BODY
Filed May 2, 1931 5 Sheets-Sheet 5
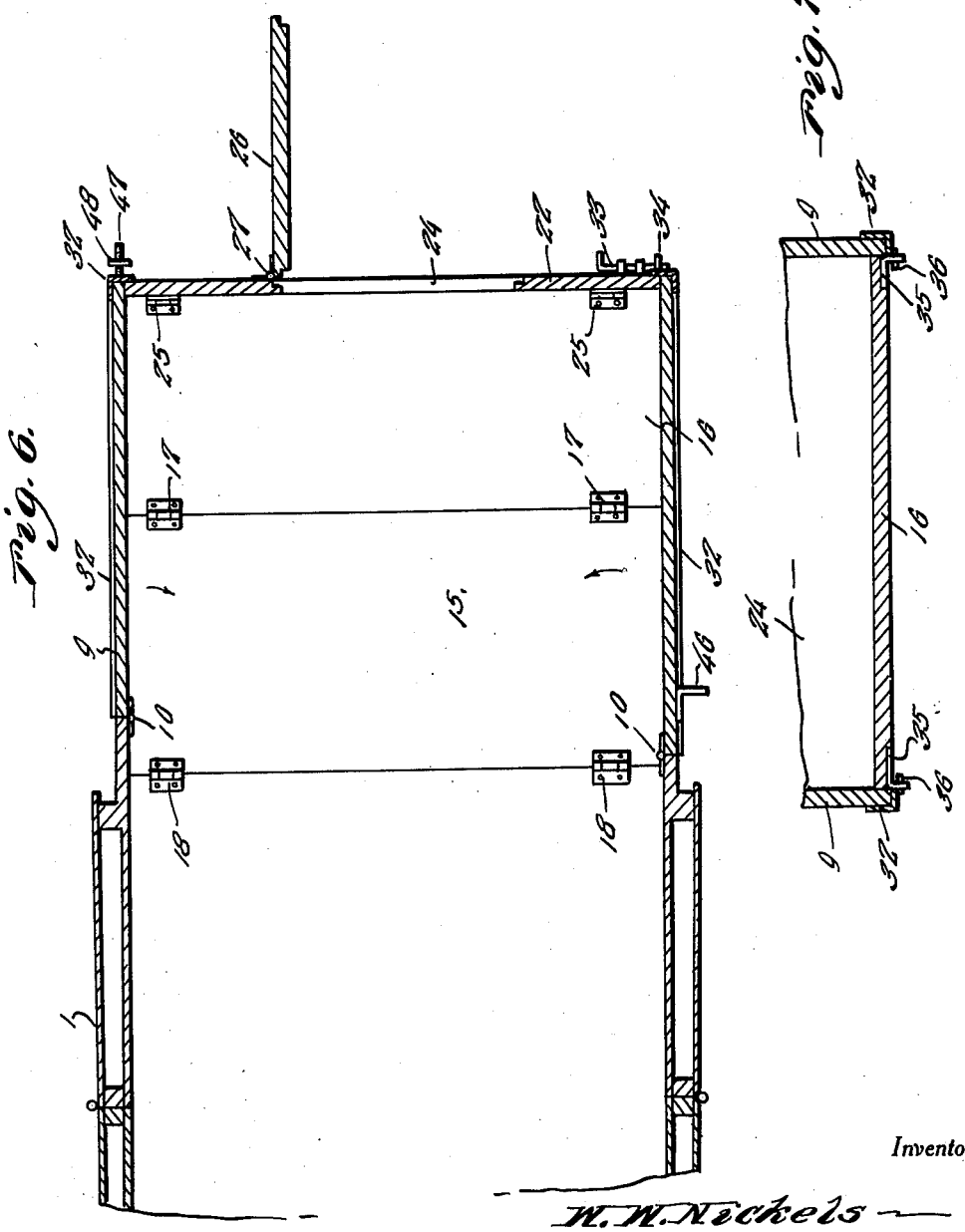
Inventor
W. W. Nickels
By Clarence A. O'Brien
Attorney

Patented Mar. 15, 1932

1,849,732

UNITED STATES PATENT OFFICE

WILLIAM W. NICKELS, OF BRISTOL, VIRGINIA, ASSIGNOR OF ONE-FOURTH TO P. H. MOORE AND ONE-FOURTH TO W. G. CARTER, BOTH OF BRISTOL, VIRGINIA

VEHICLE BODY

Application filed May 2, 1931. Serial No. 534,647.

This invention relates to new and useful improvements in vehicle bodies and has for its primary object to provide, in a manner as hereinafter set forth, a structure of this character embodying a foldable extension on the rear end portion through the medium of which the body may be expeditiously enlarged when desired thereby rendering the same particularly adapted for use for touring and camping purposes.

Other objects of the invention are to provide a vehicle body of the character described which will be simple in construction, strong, durable, efficient, attractive in appearance and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein :—

Figure 1 is a view principally in side elevation showing the rear end portion of a vehicle body constructed in accordance with this invention.

Figure 2 is a view in side elevation of the body showing the same in extended position.

Figure 3 is a view in vertical longitudinal section through the end portion of the vehicle body showing the same in extended position.

Figure 4 is a view in vertical longitudinal section through the rear end portion of the vehicle body showing the same in folded or collapsed position.

Figure 5 is a view in rear elevation of the body showing the swinging top section raised and the remaining elements of the extension in folded or closed position.

Figure 6 is a view in horizontal cross section taken substantially on the line 6—6 of Figure 3 looking downwardly, as indicated by the arrows.

Figure 8:
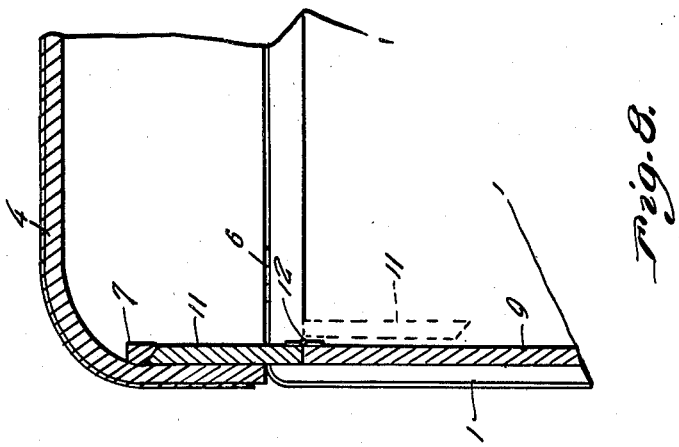
Figure 8 is a fragmentary view in vertical cross section taken substantially on the line 8—8 of Figure 3.

Referring now to the drawings in detail, it will be seen that the invention comprises the body 1 having any suitable seating arrangement therein, a rear seat to be designated by the reference numeral 2. The rear seat 2 preferably is of a type or construction which will permit the same to be expeditiously removed. The body 1 is open at its rear end. 3 designates the rear wheels upon which the body is mounted.

The extensible portion of the body includes what may be a substantially dome-shaped top section 4 having a window 5 therein, said top section being hingedly connected, as at 6, for swinging movement in a vertical plane to the top of the rear end of the main body 1. Extending along the sides of the interior of the top section 4 are the cleats 7, which, as best seen in Figure 8, are provided with inclined or beveled lower sides and the purpose of these cleats will be more fully hereinafter set forth. A cleat 8 is secured in the free end of the top section 4.

The extensible portion of the body further includes a pair of side walls including a lower section 9 hingedly connected, as at 10, to the rear ends of the side walls of the main body 1. The extensible side walls further include the upper sections 11 which are hingedly connected, as at 12, for swinging movement in a vertical plane on the upper edges of the lower sections 9. The upper sections 11 of the extensible side walls are adapted to be swung upwardly from the position indicated in broken lines in Fig. 8 of the drawings to the position shown in full lines in said Figure 8 for engagement beneath the cleats 7 in a manner to support the top section 4 in raised position. The upper edges of the sections 11 being inclined or beveled to conform to the lower sides of the cleats 7. The upper sections 11 are provided with openings 13. It will be noted that the side portions of the top section 4 extend below the openings 13 in the upper side wall sections 11. The lower sections 9 of the extensible side walls are provided with windows 14.

The extensible portion of the body further includes a bottom or floor which comprises the sections 15 and 16 which are hingedly connected together, as at 17. The inner floor section 15 is hingedly, as at 18, for swinging movement in a vertical plane to the rear end of the floor of the main body 1. When in unfolded or open position, the section 15 of the extensible floor is supported on the raised portions 19 of a bumper bar 20 which is rigidly mounted in any suitable manner on the rear end portion of the main body 1 and which extends rearwardly therefrom.

The rear end wall of the extensible portion of the body is designated generally by the reference numeral 21 and comprises an upper section 22 which is hingedly mounted, as at 23, on the cleat 8 in the top section 4. The end wall 21 further includes a lower section 24 which is hingedly connected, as at 25, to the free end portion of the section 16 of the extensible floor. A door 26 is hingedly mounted, as at 27, (see Figure 6) for swinging movement in a horizontal plane on the end wall 21, and said door is provided with a window 28. The door 26 includes an upper section 29 which is hinged on the upper section 22 of the end wall 21 and a lower section 30 which is hinged on the lower section 24 of the end wall 21. Suitable latching means 31 may be provided for releasably securing the upper and lower sections 29 and 30 of the door 26 together for swinging movement in unison when the body is in extended position. The door sections 29 and 30 are, of course, disconnected from each other when the body extension is to be folded.

Figure 7:
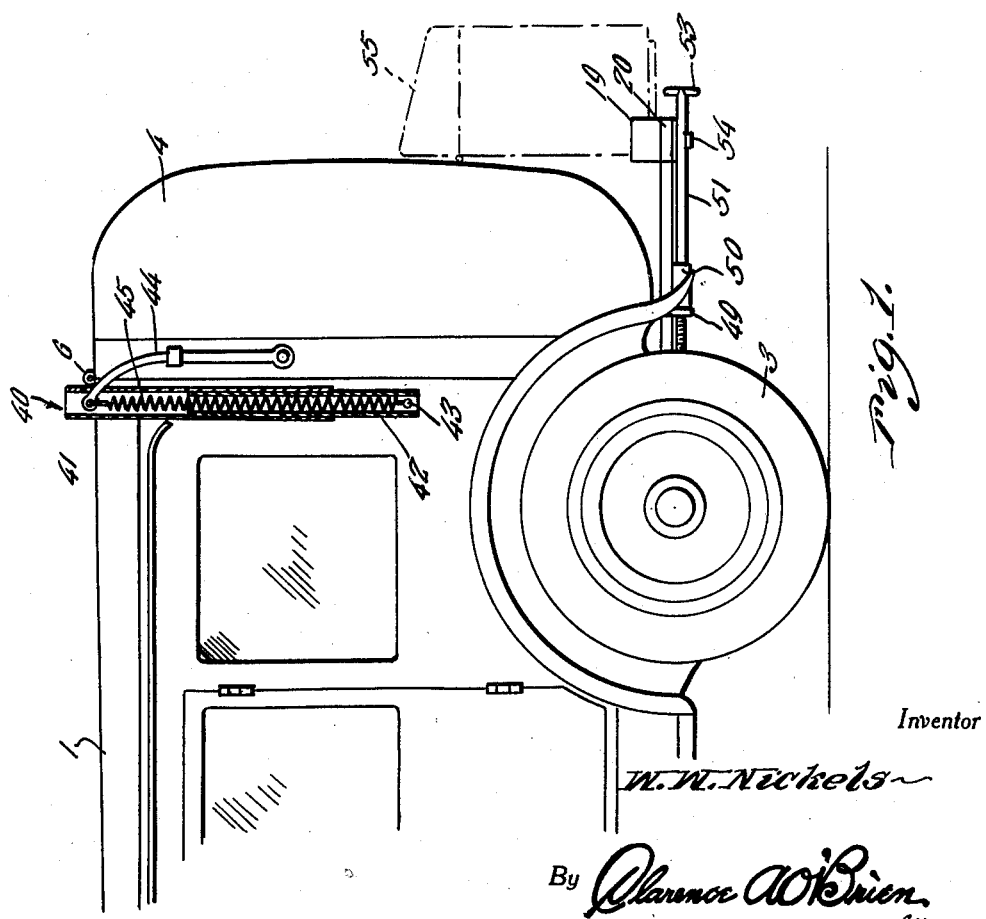
Figure 7 is a view in vertical cross section taken substantially on the line 7—7 of Figure 3 looking in the direction indicated by the arrows.

An angle iron strip 32 extends along the lower and free vertical edges of the lower sections 9 of the extensible side walls and projects inwardly from said lower sections 9 in order that the floor sections 15 and 16 may rest thereon and in order that the end wall 21 may engage therewith, as illustrated to advantages in Figures 6 and 7 of the drawings. From a consideration of Figure 3 it will be seen that the angle iron strips 32 project a slight distance above the lower side wall sections 9 into the lower portion of the top section 4 when said top section is raised. Suitable sliding bolts 33 are provided on the vertical marginal portions of the end wall 21 for engagement in eyes 34 (see Figure 6) for securing the end walls against inward swinging movement.

Referring now to Figure 7 of the drawings, it will be seen that the bottom or floor sections 15 and 16 are provided with angular elements 35 having portions depending therefrom adjacent the lower ends of the sections 9 of the side walls, depending portions of the elements 35 having openings extending therethrough for the reception of pins 36 to retain the floor sections against upward swinging movement. The pins 36 are, of course, removable.

Elongated plates 37 (see Figure 3) are mounted for vertical sliding movement on the inner sides of the rear end portions of the side walls of the main body 1. It may be well to here state or to call attention to the fact that the side walls of the main body 1 extend rearwardly a slight distance beyond the top and floor of said main body. The plates 37 are provided with slots 38 for the passage of the clamping screws or elements 39 mounted in the side walls of the main body 1. The plates 37 are for the purpose of closing the opening or space between the upper side wall sections 11 and the rear end of the top section 4. Securing elements 39 are adapted to frictionally clamp the plates 37 in any adjusted position.

Referring now to Figures 1, 2 and 5 of the drawings, it will be seen that lifting means for the top section 4 is designated generally by the reference numeral 40 and comprises a pair of telescopic tubular sections 41 and 42, the sections 42 being hingedly connected, as at 43, at its lower end for swinging movement in a vertical plane on the outer side of one of the side walls of the main body 1. If desired, one of the lifting units 40 may be provided on each side of the body. The lifting unit 40 further includes a curved arm 44 rigidly mounted on the adjacent side of the top section 4 and extending into the free or outer end portion of the section 41. The coil spring 45 has one end connected to the pivot pin 43 which traverses the lower end portion of the section 42 and said spring has its other end connected to the free end of the arm 44 which is disposed in the upper telescopic section 41. The coil spring 45 yieldingly urges the top section 4 upwardly, as will be apparent. The telescopic sections 41 and 42 provide a housing for the spring 45.

One of the lower sections 9 of the extensible side walls has mounted on its outer side a bracket 46 having a slotted free end portion for the reception of a threaded bolt 47 which projects from the free end of the other wall section 9 and has threaded thereon a suitable binding or locking nut 48 for engagement with the bracket 46 to releasably secure the extensible side walls in folded position as illustrated to advantage in Figure 5 of the drawings.

A slotted plate 49 projects from the free end of the top section 4 and is adapted for engagement by a collar 50 which is fixed on an intermediate portion of a rod 51 having its forward end portion threaded through a sleeve 52 which, in turn, is mounted for rotary movement beneath the floor of the main body 1. At its outer end the rod 51 is provided with a cross head providing an actuating handle 53. A spring clip 54 is mounted on the lower side of the bumper bar 20 for supporting the rear end of the rod 51 when said rod is not in use. The rod 51